United States Patent
Rudolph et al.

(10) Patent No.: US 10,154,093 B2
(45) Date of Patent: Dec. 11, 2018

(54) METHOD, SYSTEM, AND COMPUTER-READABLE MEDIUM FOR STORING DIAGNOSTIC DATA RELATING TO A VEHICLE

(71) Applicant: Bayerische Motoren Werke Aktiengesellschaft, Munich (DE)

(72) Inventors: Joachim Rudolph, Munich (DE); Juergen Hofmann, Weilheim i. OB (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 181 days.

(21) Appl. No.: 15/185,117

(22) Filed: Jun. 17, 2016

(65) Prior Publication Data

US 2016/0381140 A1 Dec. 29, 2016

(30) Foreign Application Priority Data

Jun. 24, 2015 (DE) .................. 10 2015 211 641

(51) Int. Cl.
 *H04L 29/08* (2006.01)
 *G07C 5/08* (2006.01)
(52) U.S. Cl.
 CPC .......... *H04L 67/1097* (2013.01); *G07C 5/085* (2013.01); *H04L 67/12* (2013.01)
(58) Field of Classification Search
 CPC ....... H04L 29/08; H04L 12/24; H04L 12/861; G07C 5/08

USPC ......................................................... 709/223
See application file for complete search history.

(56) References Cited

U.S. PATENT DOCUMENTS

| 8,781,442 B1* | 7/2014 | Link, II ................. G08G 1/205 370/338 |
| 2009/0112907 A1* | 4/2009 | Mukherjee ............. G06Q 10/10 |
| 2010/0204857 A1* | 8/2010 | Forrest ................ B61L 27/0094 701/19 |

* cited by examiner

*Primary Examiner* — Tu T Nguyen
(74) *Attorney, Agent, or Firm* — Crowell & Moring LLP

(57) ABSTRACT

A method for storing vehicle diagnostic data includes the steps of: reading one or more messages including vehicle diagnostic data; transmitting the read messages to a buffer memory; transmitting the read messages to an aggregation component; aggregating the read messages by use of the aggregation component to form an aggregated message; transmitting the aggregated message to the buffer memory; checking whether a predefined fault event occurred during aggregation of the messages; if a predefined fault event occurred: transmitting the predefined fault event to an extraction component, the predefined fault event including at least one predefined rule; executing the at least one predefined rule by the extraction component in order to extract the messages corresponding to the at least one predefined rule from the buffer memory; and storing the extracted messages and the fault event in a data memory, such that the extracted messages can be identified using the fault event.

19 Claims, 3 Drawing Sheets

METHOD, SYSTEM, AND COMPUTER-READABLE MEDIUM FOR STORING DIAGNOSTIC DATA RELATING TO A VEHICLE

CROSS REFERENCE TO RELATED APPLICATIONS

This application claims priority under 35 U.S.C. § 119 from German Patent Application No. 10 2015 211 641.7, filed Jun. 24, 2015, the entire disclosure of which is herein expressly incorporated by reference.

BACKGROUND AND SUMMARY OF THE INVENTION

The invention relates to a method for storing diagnostic data relating to a vehicle. In particular, the invention relates to a method for storing messages, in particular bus messages, for analyzing diagnostic data relating to a vehicle.

With the increasing networking of components in a vehicle, for example in a motor vehicle, the quantity of data transmitted on communication systems, for example bus systems, of a vehicle is greatly increasing. With the increase in data transmitted on communication systems of a vehicle, the quantity of data which can be analyzed during vehicle diagnosis is also increasing. In the field of vehicle diagnosis, messages which are transmitted on bus systems, for example, may be aggregated using a mapping rule to form aggregated messages or data objects. It is known practice, for example, to aggregate messages according to the CAN bus transport protocol standard in accordance with the ISO standard 15765 to form messages according to the Unified Diagnostic Services (UDS for short) standard in accordance with the ISO standard 14229. The messages can generally be aggregated in a multilayer manner. Faults may occur on any level or layer and can be analyzed as part of vehicle diagnosis. The diagnostic data to be analyzed during vehicle diagnosis may comprise in this case all messages on all aggregation levels of communication systems of a vehicle. Analysis of an individual fault can therefore often require a large amount of time since the relevant diagnostic data usually have to be determined in a largely manual manner from the total quantity of available diagnostic data.

Therefore, an object of the invention is to provide more efficient storage of the diagnostic data relating to vehicles. In particular, an object of the invention is to improve the storage of the diagnostic data so as to enable more flexible, simpler and/or faster analysis of fault events using the stored diagnostic data.

This and objects are achieved by a method and system in accordance with embodiments of the invention.

According to one aspect, a method according to the invention is used to store diagnostic data relating to a vehicle, in particular a motor vehicle. Diagnostic data may include all messages between network components, for example control devices, and/or software components of a vehicle. For example, the diagnostic data may be messages from bus systems and/or aggregated messages. Messages may have a different format and/or a different data type. Storing diagnostic data may involve providing the diagnostic data for the purpose of analyzing the diagnostic data. The method includes reading one or more messages, the read messages comprising diagnostic data relating to the vehicle. The method also includes transmitting the read messages to a buffer memory and to an aggregation component, aggregating the read messages by way of the aggregation component to form an aggregated message, and transmitting the aggregated message to the buffer memory. A buffer memory may be a ring memory. An aggregation component may be a software component which can aggregate one or more messages according to predefined mapping and/or processing rules. For example, an aggregation component may be implemented in the form of an automaton, in particular in the form of a finite, deterministic automaton. The method also checks whether a predefined fault event occurred during aggregation of the messages by the aggregation component. If a predefined fault event occurred, the method can transmit the predefined fault event to an extraction component, the predefined fault event comprising at least one predefined rule. A predefined fault event may be a fault memory entry of a control device, for example. In order to extract the messages, the extraction component can execute the at least one predefined rule and can extract the messages defined in the predefined rule from the buffer memory. The extracted messages and the fault event can be stored in a data memory, with the result that the extracted messages can be identified using the fault event.

The messages which may be relevant to the analysis of a fault event may be advantageously extracted from the total quantity of diagnostic data and can be stored in a data memory together with the fault event. This makes it possible to efficiently reduce the quantity of data which needs to be stored for the purpose of analyzing a fault event. Diagnostic data which are not relevant on different aggregation levels can therefore be efficiently filtered.

According to one advantageous configuration, the extracted messages may include read messages and aggregated messages. Extracting read messages and aggregated messages makes it possible to efficiently store the extracted messages over a plurality of aggregation levels. The stored messages therefore make it possible to quickly analyze a fault event over one or more aggregation levels.

According to another advantageous configuration, the buffer memory may be a ring memory. Using a ring memory makes it possible to efficiently buffer the read messages and/or aggregated messages. For example, it is possible to stipulate that the storage capacity of the ring memory is different for read messages and/or aggregated messages. For example, it is possible to stipulate a fixed storage capacity for the ring memory. For example, it is possible to stipulate a storage capacity of the ring memory on the basis of an available main memory of a computer in order to be able to completely store the ring memory in the main memory and therefore make it possible to write and/or extract the messages more quickly. For example, a storage capacity of the ring memory may be dynamically adapted to the diagnostic data, for example the quantity and/or type of diagnostic data. Choosing the storage capacity of the ring memory makes it possible to efficiently buffer the diagnostic data. Furthermore, the diagnostic data can be buffered so as to make it possible to efficiently extract the diagnostic data or messages from the buffer memory.

According to another advantageous configuration, the method may also include transmitting the extracted messages to a de-duplication component, the de-duplication component removing extracted messages which have been repeatedly extracted from the ring memory before storing the extracted messages in the data memory. Removing identical messages which are repeatedly extracted when executing one or more rules of fault events makes it possible to ensure that each extracted message is stored only once in the data memory. The redundancy when storing the extracted messages can therefore be reduced. The storage space of the data memory can be used more efficiently.

According to another advantageous configuration, the extraction component can allocate a unique designator to each extracted message, and/or can store the extracted messages and the unique designators of the extracted messages in the data memory. Allocating a unique designator, for example a unique identifier, makes it possible to efficiently process and/or store an extracted message. Furthermore, the unique designator may enable a simple link between the fault event and the associated messages.

According to another advantageous configuration, the de-duplication component can remove repeatedly extracted identical messages by means of the unique designator of an extracted message. This makes it possible to efficiently reduce the storage space needed to store the extracted messages in the data memory.

According to another advantageous configuration, the extraction component can allocate the unique designators of the extracted messages to each fault event. All extracted messages can be identified as belonging to a fault event in the data memory using the unique designator. Storage can therefore be carried out independently of contents of an extracted message. Each read and/or aggregated message of a fault event can be efficiently stored in the data memory and/or read from the data memory for further processing.

According to another advantageous configuration, the extraction component can transmit the fault events, with the allocated unique designators of the extracted messages, to the data memory for storage. This makes it possible to efficiently link the extracted messages to a fault event.

According to another aspect, the invention includes a system for storing diagnostic data relating to a vehicle, the system being designed to carry out the method described above.

According to another aspect, the invention includes a computer-readable medium for storing diagnostic data relating to a vehicle, the computer-readable medium comprising instructions which, when executed on a processor, carry out the method described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
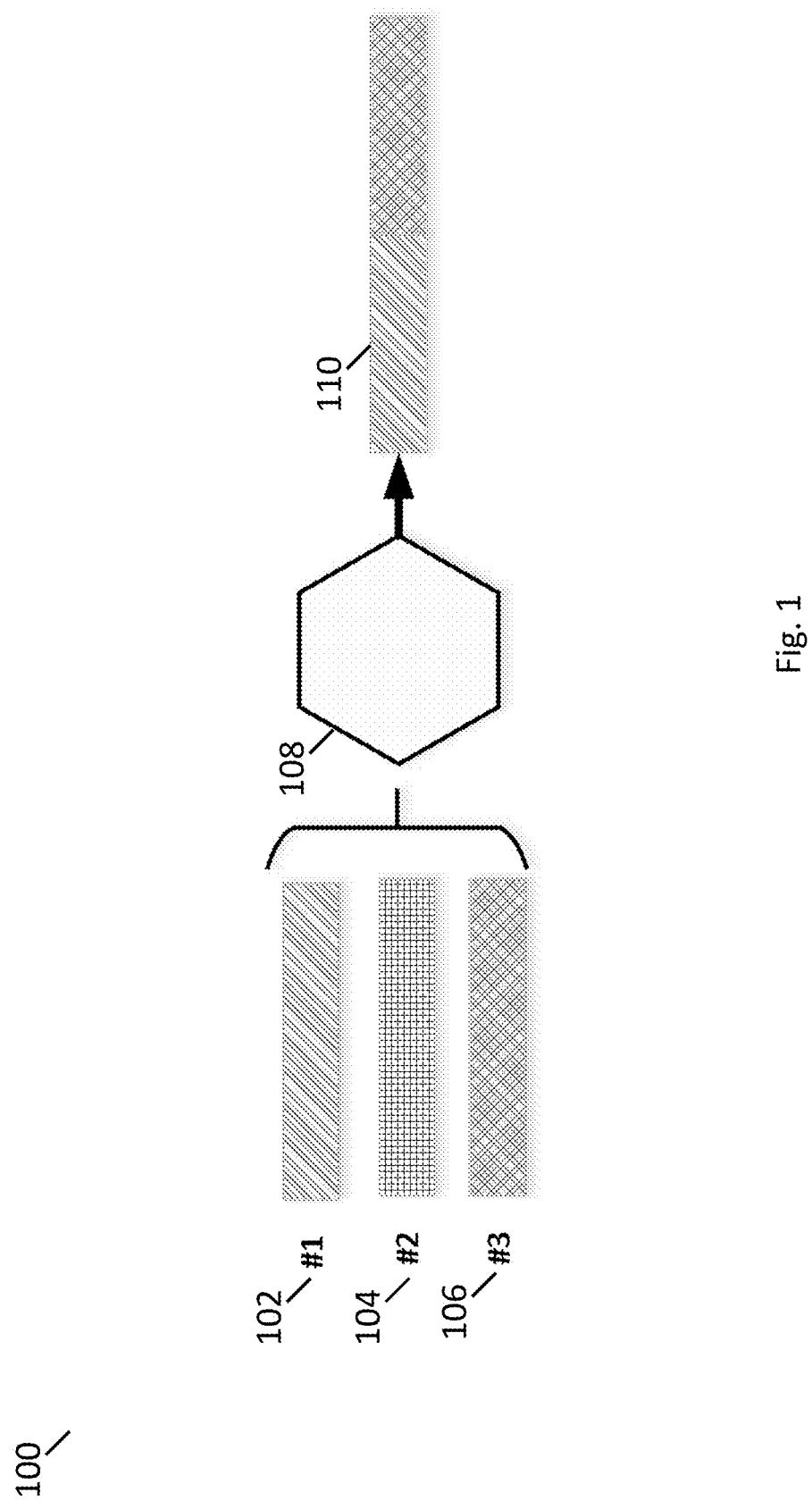
FIG. 1 schematically shows exemplary aggregation of messages to form a higher-quality message.

In detail, FIG. 1 shows exemplary aggregation 100 of messages 102, 104, 106 to form a higher-quality message 110. As illustrated in FIG. 1, three messages 102, 104, 106 are aggregated. For example, the messages 102, 104, 106 may be frames according to the ISO 15765 standard. The first message 102 may be a first frame. The second message 104 may be a flow control frame. The third message 106 may be a subsequent frame. The three messages 102, 104 and 106 may be transmitted to a software component 108, for example a finite, deterministic automaton. The software component 108 may aggregate the three messages 102, 104 and 106 to form a higher-quality message 110. In the example from FIG. 1, the software component 108 may remove the message 104 and may combine the messages 102 and 106 to form one message. In other words: the software component 108 can remove messages containing control information relating to the flow control and can combine the remaining messages for further processing to form a higher-quality message 110. The higher-quality message 110 can be transmitted to a data memory for storage. Additionally or alternatively, the higher-quality message 110 can be transmitted to a further software component for further processing or aggregation.

Figure 2:
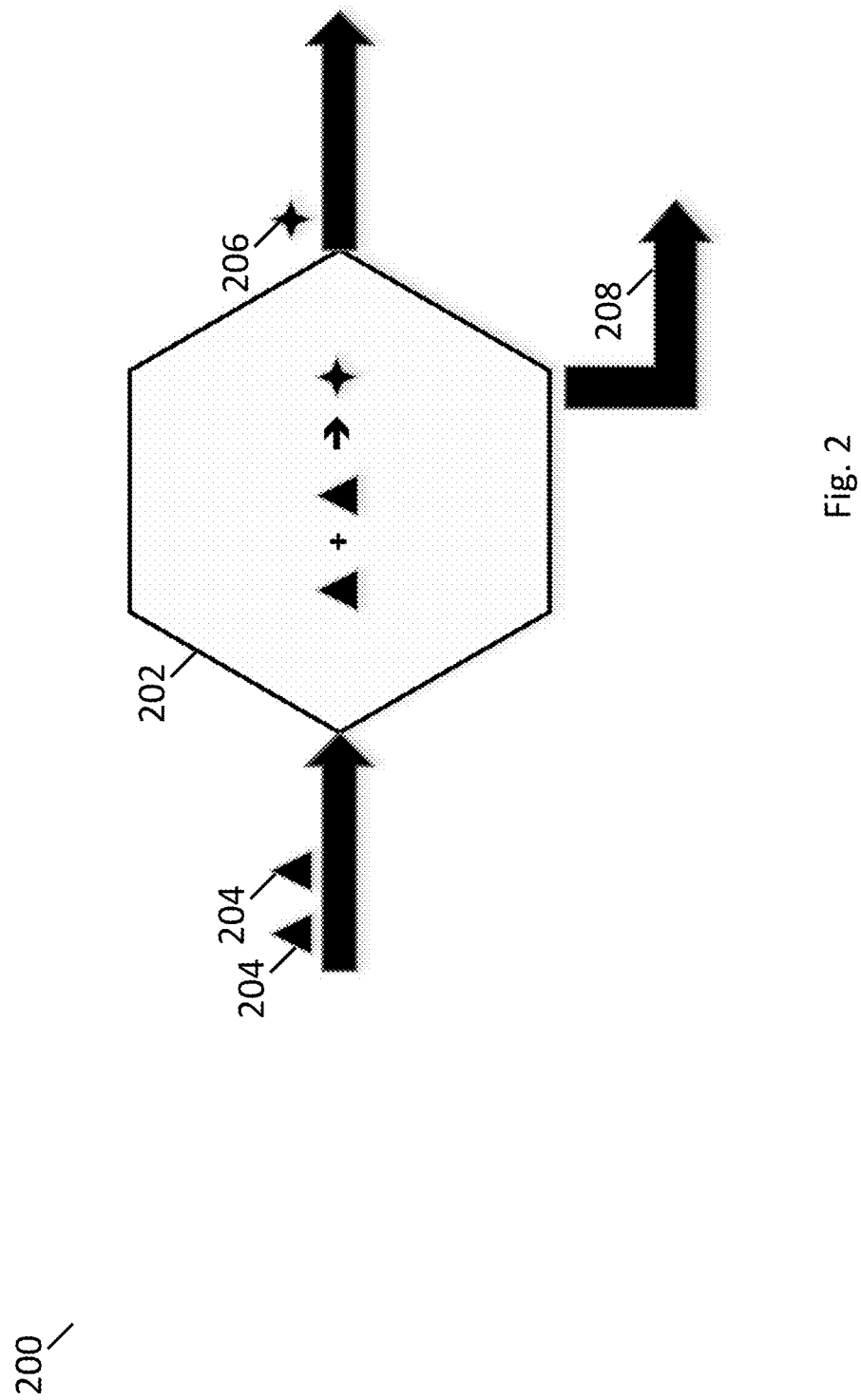
FIG. 2 schematically shows an exemplary structure of an automaton for aggregating messages.

FIG. 2 shows an exemplary structure 200 of an automaton 202, in particular a finite, deterministic automaton, which can aggregate two incoming messages 204 to form one outgoing message 206. The automaton 202 can aggregate the incoming messages 204 using one or more predefined processing rules. Each processing rule can stipulate what processing steps can be applied to the incoming messages 204 by the automaton 202. As schematically illustrated in FIG. 2, the automaton 202 may include a processing rule which combines two incoming messages 204 to form one outgoing message 206. The automaton 202 can also check whether a particular predefined event, for example a fault event, is present. For this purpose, the automaton 202 can check one or more conditions of an event. If the automaton 202 can determine whether a condition of the event is satisfied, the event is satisfied. The automaton 202 can preferably check whether all conditions of an event are satisfied. For example, the event may be a fault event. The fault event may be a fault during aggregation of the messages and/or a check of the contents of the incoming and/or outgoing messages with regard to predefined parameters, values and/or ranges of values.

An event, in particular a fault event, may also include one or more rules which are linked to the event. The linked rule(s) can stipulate what messages are relevant to the event. For example, a rule can stipulate that all messages within a predefined period are relevant to the event. For example, a rule can stipulate that a particular number of messages from one or more automata are relevant to the event. Messages which are defined as being relevant to an event can be stored together with the event. If an event occurs, the automaton 202 can preferably transmit the event and the rules linked to the event to an extraction component 208. The extraction component can receive the event and the linked rules. The linked rules can be executed by the extraction component in order to extract the messages specified in the rules and/or to store them together with the event. This makes it possible to efficiently store the messages relating to an event.

Figure 3:
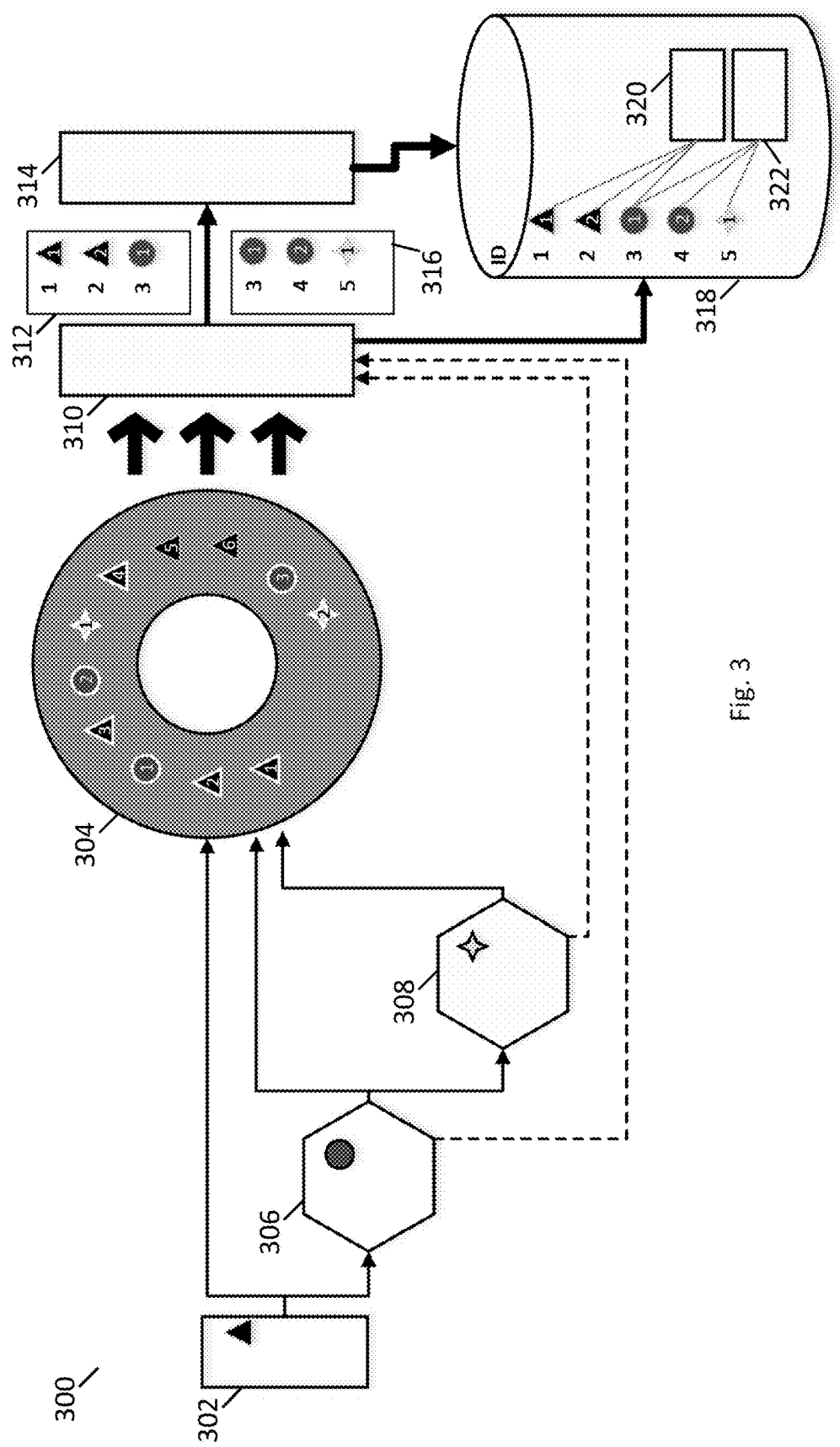
FIG. 3 schematically shows a system for extracting and/or storing diagnostic data for fault events.

FIG. 3 shows a system 300 for extracting and/or storing diagnostic data for fault events. The diagnostic data may be recorded in a communication system, for example a bus system, of a vehicle. For example, the diagnostic data may be stored in a data memory, for example a log file or trace file. The diagnostic data can be read from this data memory. For example, diagnostic data can be read from the communication system of the vehicle via a diagnostic interface. The diagnostic data, for example messages from a communication system of a vehicle, can be read by means of a reading component 302. The reading component 302 may be a software component, a hardware component or a mixture of a software component and/or a hardware component. The reading component 302 may transmit every read data record, for example every read message, of the diagnostic data to a ring memory 304. The reading component may also send a read data record, for example a read message, to an automaton 306. The automaton 306 may be a software component which, as described in connection with FIG. 2, can aggregate incoming messages to form outgoing messages and, if an event occurs, can transmit the event which has occurred and linked rules to an extraction component 310.

As illustrated in FIG. 3, the reading component 302 can transmit a message to the ring memory 304 and can transmit a message to the automaton 306. The aggregated messages from the automaton 306 can be transmitted to the ring memory 304 by the automaton 306. Furthermore, the automaton 306 can transmit the aggregated messages from the automaton 306 to a further automaton 308. The automaton 308 may be a software component which, as described in connection with FIG. 2, can aggregate incoming messages to form outgoing messages and, if an event occurs, can transmit the event which has occurred and linked rules to the extraction component 310. The automaton 308 can in turn transmit the aggregated messages from the automaton 308 to the ring memory 304. Both automata, automaton 306 and automaton 308, can therefore transmit events which occur and linked rules to the extraction component 310.

In detail, the ring memory 304 may buffer read messages and/or aggregated messages. Read messages may be messages which are stored in the ring memory without change. Aggregated messages may be messages which are aggregated by one or more automata and are stored in the ring memory after aggregation. The ring memory may have a predefined, fixed capacity limit for all messages. The capacity limit may be configurable. For example, the capacity limit may be stipulated on the basis of the vehicle type, on the basis of the amount of diagnostic data, and/or on the basis of the available main memory of the system on which the ring memory 304 is stored. Additionally and/or alternatively, the capacity limit of the ring memory 304 may be defined differently for read messages and aggregated messages from the automata. For example, the storage capacity for aggregated messages from the automaton 306 may be different from the storage capacity for aggregated messages from the automaton 308. The capacity limit of the ring memory 304 may be defined, for example, as the maximum number of read and/or aggregated messages. Additionally and/or alternatively, the capacity limit of the ring memory 304 may be stipulated as a maximum quantity of data which can be respectively stored in read and/or aggregated messages.

For example, if the automaton 306 has identified a fault event, the automaton 306 can transmit the fault event to the extraction component 310. The fault event preferably includes one or more rules which specify what messages are intended to be extracted from the ring memory by the extraction component 310. The extraction component 310 can execute the rule(s) received with the fault event in order to extract the associated messages from the ring memory to the extraction component 310. A rule of a fault event of the automaton 306 may define, for example, that all messages within the last 5 seconds of the fault event should be extracted by the extraction component 310. The extraction component 310 executes this rule and extracts the corresponding messages from the ring memory 304.

The automaton 308 can likewise check whether a fault event occurred during aggregation of the messages. In a similar manner to the automaton 306, the automaton 308 can transmit the fault event and an associated rule for extracting the messages from the ring memory 304 to the extraction component 310. The extraction component 310 can receive the fault event and can execute the associated rule in order to extract the messages from the ring memory 304. A rule of a fault event of the automaton 308 can specify, for example, that the last two messages from the automaton 306 and the last message from the automaton 308 are intended to be extracted from the ring memory 304 for this fault event.

As illustrated in FIG. 3, the extraction component 310 can extract the messages 312 for the fault event of the automaton 306, for example, and can extract the messages 316 for the fault event of the automaton 308. The extraction component 310 can allocate a designator, preferably a unique designator, to each extracted message. The extraction component 310 allocated the designators 1, 2 and 3 to the messages 312. The extraction component 310 allocated the designators 3, 4 and 5 to the messages 316. Both the messages 312 and the messages 316 have a message having the designator 3. This means that the extraction component 310 extracted the message having the designator 3 from the ring memory 304 in both fault events.

The extraction component 310 can also link the designators of the messages to the respective fault events. The extraction component 310 can transmit the fault events, with the respective designators 320, 322, to a data memory 318. The data memory 318 can store the fault events 320 and 322 and the designators of the extracted messages in the data memory 318. The data memory 318 may be a database and/or a file, for example.

The extraction component 310 can also transmit the extracted messages 312 and 316 to a de-duplication component 314. The de-duplication component 314 can remove the repeatedly extracted messages, with the result that no duplicate messages are stored in the data memory 318. After the duplicate or repeatedly extracted messages have been removed by the de-duplication component 314, the de-duplication component 314 can store the extracted messages and the associated designators in the data memory 318. The associated messages can be referenced for each fault event using the designator.

The method and the system enable efficiently improved provision and/or storage of the relevant messages relating to a specific event, in particular a specific fault event. The storage of the messages and events can be carried out in a manner which is optimal for the memory and, on account of the use of a ring memory and the generic definition of the events, can be implemented in a scalable manner. Each event can itself stipulate what messages are relevant to the event for the user.

The data memory can also make it possible to efficiently analyze the fault events. Messages on all aggregation levels and the unchanged messages in the diagnostic data can be efficiently stored together with a fault event.

The flexible configuration of the ring memory makes it possible to implement a buffer memory which is efficient in terms of memory. Messages from different aggregation levels can be extracted at the same time. The diagnostic data can therefore be processed in one run. Further time-consuming steps for processing the diagnostic data are not required. It is therefore possible to avoid processing diagnostic data again. Furthermore, it is possible to automatically filter the diagnostic data on all aggregation levels. Non-relevant data can be efficiently filtered, which may result in the storage space of the data memory being used efficiently.

LIST OF REFERENCE SYMBOLS

100 Aggregation
102 Message

104 Message
106 Message
108 Automaton or aggregation component
110 Higher-quality or aggregated message
200 Exemplary structure of an automaton
202 Automaton
204 Incoming message
206 Outgoing or aggregated message
208 Event
300 System
302 Reading component
304 Ring memory
306 Automaton
308 Automaton
310 Extraction component
312 Extracted messages
314 De-duplication component
316 Extracted messages
318 Data memory
320 Fault event including designator
322 Fault event including designator The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for storing diagnostic data relating to a vehicle, the method comprising the acts of:
    reading one or more messages, the read messages comprising diagnostic data relating to the vehicle;
    transmitting the read messages to a buffer memory;
    transmitting the read messages to an aggregation component;
    aggregating the read messages by the aggregation component to form an aggregated message;
    transmitting the aggregated message to the buffer memory;
    checking whether a predefined fault event occurred during aggregation of the messages by the aggregation component;
    if a predefined fault event occurred:
        transmitting the predefined fault event to an extraction component,
        the predefined fault event comprising at least one predefined rule;
        executing the at least one predefined rule of the extraction component in order to extract the messages corresponding to the at least one predefined rule from the buffer memory; and
        storing the extracted messages and the fault event in a data memory, with the result that the extracted messages can be identified using the fault event.

2. The method according to claim 1, wherein the extracted messages comprise read messages and aggregated messages.

3. The method according to claim 1, wherein the buffer memory is a ring memory.

4. The method according to claim 1, the method further comprising the act of:
    transmitting the extracted messages to a de-duplication component, the de-duplication component removing messages which have been repeatedly extracted before storage in the data memory.

5. The method according to claim 1, wherein:
    the extraction component allocates a unique designator to each extracted message; and/or
    the extracted messages and the unique designators of the extracted messages are stored in the data memory.

6. The method according to claim 5, wherein the de-duplication component removes repeatedly extracted messages by use of the unique designator of an extracted message.

7. The method according to claim 6, wherein the extraction component allocates the unique designators of the extracted messages to each fault event.

8. The method according to claim 7, wherein the extraction component transmits the fault events, with the allocated unique designators of the extracted messages, to the data memory for storage.

9. The method according to claim 5, wherein the extraction component allocates the unique designators of the extracted messages to each fault event.

10. The method according to claim 9, wherein the extraction component transmits the fault events, with the allocated unique designators of the extracted messages, to the data memory for storage.

11. A system for storing diagnostic data relating to a vehicle, the system comprising:
    a processor and associated memory operatively configured to execute instructions to:
    read one or more messages, the read messages comprising diagnostic data relating to the vehicle;
    transmit the read messages to a buffer memory;
    transmit the read messages to an aggregation component;
    aggregate the read messages by the aggregation component to form an aggregated message;
    transmit the aggregated message to the buffer memory;
    check whether a predefined fault event occurred during aggregation of the messages by the aggregation component;
    if a predefined fault event occurred:
        transmit the predefined fault event to an extraction component,
        the predefined fault event comprising at least one predefined rule;
        execute the at least one predefined rule of the extraction component in order to extract the messages corresponding to the at least one predefined rule from the buffer memory; and
        store the extracted messages and the fault event in a data memory, with the result that the extracted messages can be identified using the fault event.

12. The system according to claim 11, wherein the extracted messages comprise read messages and aggregated messages.

13. The system according to claim 11, wherein the buffer memory is a ring memory.

14. The system according to claim 11, wherein the extracted messages are transmitted to a de-duplication component, the de-duplication component removing messages which have been repeatedly extracted before storage in the data memory.

15. The system according to claim 11, wherein:
    the extraction component allocates a unique designator to each extracted message; and/or
    the extracted messages and the unique designators of the extracted messages are stored in the data memory.

16. The system according to claim 15, wherein the deduplication component removes repeatedly extracted messages by use of the unique designator of an extracted message.

17. The system according to claim 16, wherein the extraction component allocates the unique designators of the extracted messages to each fault event.

18. The system according to claim 17, wherein the extraction component transmits the fault events, with the allocated unique designators of the extracted messages, to the data memory for storage.

19. A computer product for storing diagnostic data relating to a vehicle, comprising a non-transitory-computer-readable medium having stored thereon program instructions which, when executed on a processor, cause the processor to:

read one or more messages, the read messages comprising diagnostic data relating to the vehicle;
    transmit the read messages to a buffer memory;
    transmit the read messages to an aggregation component;
    aggregate the read messages by the aggregation component to form an aggregated message;
    transmit the aggregated message to the buffer memory;
    check whether a predefined fault event occurred during aggregation of the messages by the aggregation component;
    if a predefined fault event occurred:
        transmit the predefined fault event to an extraction component,
        the predefined fault event comprising at least one predefined rule;
        execute the at least one predefined rule of the extraction component in order to extract the messages corresponding to the at least one predefined rule from the buffer memory; and
        store the extracted messages and the fault event in a data memory, with the result that the extracted messages can be identified using the fault event.

* * * * *